United States Patent [19]

Markert

[11] Patent Number: 4,506,410
[45] Date of Patent: Mar. 26, 1985

[54] APPARATUS FOR THE INTRODUCTION OF GIBLETS INTO THE BODY CAVITIES OF POULTRY

[75] Inventor: Heinrich W. Markert, Otterlo, Netherlands

[73] Assignee: Machinefabriek Markert B.V., Netherlands

[21] Appl. No.: 358,837

[22] Filed: Mar. 16, 1982

[30] Foreign Application Priority Data

Nov. 6, 1981 [DE] Fed. Rep. of Germany ....... 3144178

[51] Int. Cl.³ .............................................. A22C 21/00
[52] U.S. Cl. ............................................ 17/11; 17/24
[58] Field of Search ................................. 17/11, 24, 45

[56] References Cited

U.S. PATENT DOCUMENTS 3,540,074 11/1970 Lawson ................................. 17/11
3,806,988 4/1974 Harden, Jr. ........................... 17/11

FOREIGN PATENT DOCUMENTS 3015336 11/1981 Fed. Rep. of Germany .......... 17/11
2077567 12/1981 United Kingdom .................... 17/11

Primary Examiner—Willie G. Abercrombie
Attorney, Agent, or Firm—Shapiro and Shapiro

[57] ABSTRACT

In an apparatus for the introduction of poultry giblets into the evacuated body cavities of poultry, a plurality of cups which contain the giblets are moved into an insertion region together with the poultry, which is also moved, on a path while a plunger thrusts the giblets into the body cavity of the poultry after a cup has been introduced with its narrower end into the body cavity. The plunger is selectively driven, so that in the event that no poultry is present, the plunger is not actuated. In addition stabilizing devices are provided for the poultry.

12 Claims, 3 Drawing Figures

APPARATUS FOR THE INTRODUCTION OF GIBLETS INTO THE BODY CAVITIES OF POULTRY

BACKGROUND OF THE INVENTION

The invention relates to apparatus for the introduction of giblets, preferably packed in bags, into the cleaned body cavities of poultry.

The state of this art is known from German Offenlegungsschrift No. 30 15 336. This device produces, in respect of the automation of the introduction of giblets into the body cavities of poultry, an important advantage in that the manpower requirements can to a considerable extent be reduced. Further measures are still necessary however for reliable operation of the complete device.

SUMMARY OF THE INVENTION

The invention has the underlying object of further improving the above-mentioned apparatus in order to ensure improved functional operation of the device.

According to the invention a giblet-introducing plunger is operable by means of a selectively controllable drive, which is operable only when a sensor has established that poultry is present in the insertion region.

Normally the birds are brought one after another to an introduction region at a given spacing on a conveyor means. However, it frequently happens that one or more birds are absent from the sequence. If then, according to the state of the art, the plungers are forceably controlled, in each case one bag with giblets placed in the cups is pushed out by the plunger and thereby is not thrust into the body cavity of a bird, but into the surrounding region of the machine. This leads to a considerable pollution of the installation and to increasing wastage of giblets. If however, according to the invention, the plunger is suitably controlled, and of course only if in fact a bird is established to be on the said conveyor means, the cup is subject to the usual movement even if no bird is on hand. Nevertheless there takes place no movement of the plunger in the cup and thereby also no rejection of the bag from the cup. This cup with the bag is guided again around the circulatory conveying means to the position where an operator feeds the bags into the cups. This cup then no longer needs to be loaded at this position.

In the insertion region is provided a pushing element which with a controlled force from outside is pushed against the poultry, in order to stabilize it for the introduction of the cup and of the bag with the giblets. A branched section of the mounting of the cup serves as a counter surface, which section is provided on the side of the poultry opposite to the pushing element.

In order to introduce into the body cavity the cup which tapers towards the bottom and thereby to facilitate the insertion of the bag, with lowering of the cup a spreader element is directed between the legs of the poultry in order to widen the opening of the body cavity.

Further advantageous developments appear from the following claims.

Further details, features and advantages of the invention appear from the following description of the exemplary embodiments which is represented purely schematically in the accompanying drawings.

DESCRIPTION OF PREFERRED EMBODIMENT

Figure 1:
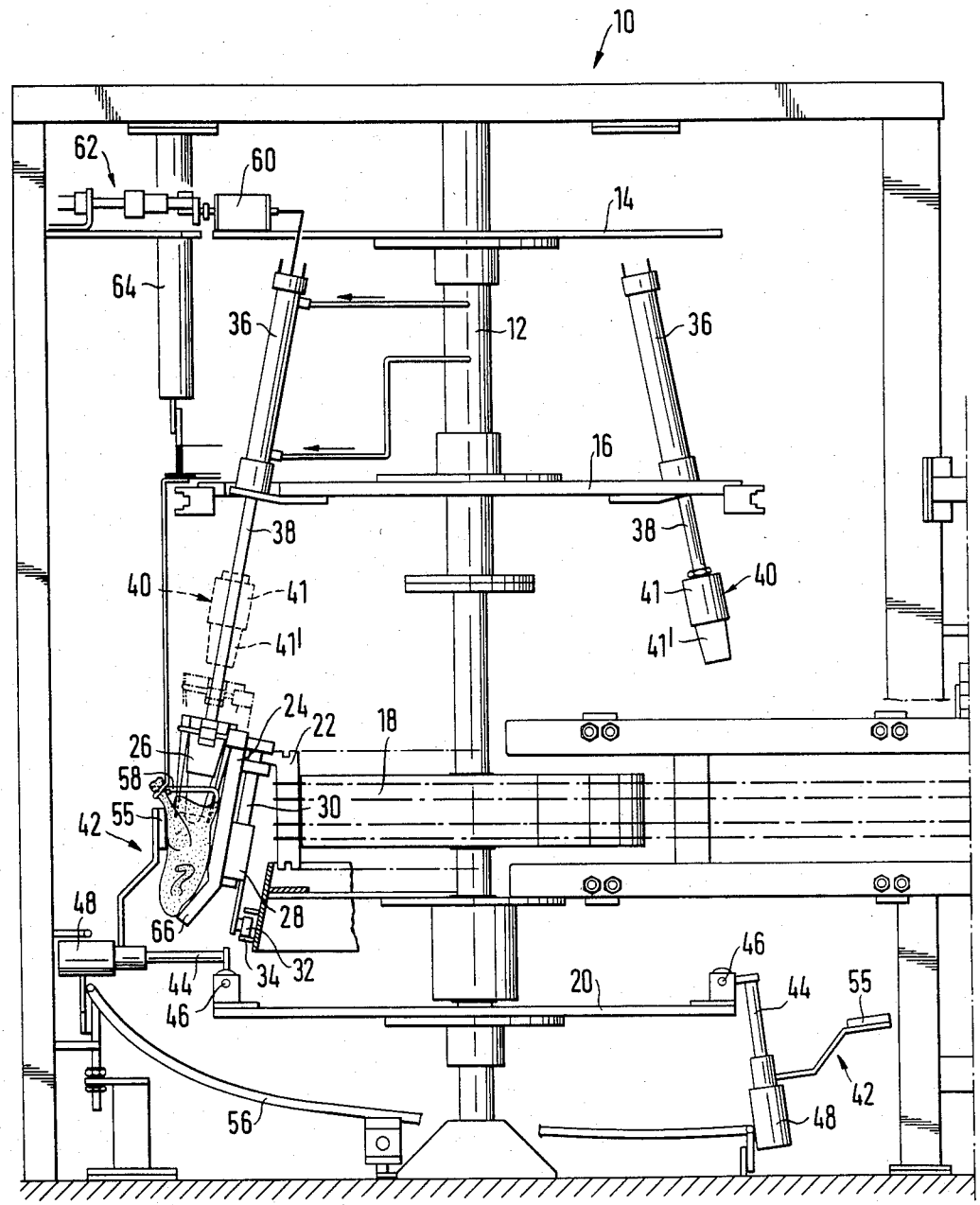
FIG. 1 schematically shows a longitudinal sectional view through the carrousel region of a device according to the invention, FIG. 2 schematically shows a longitudinal sectional view through the remaining part of the device according to the invention with the turn-round region for the conveyor carrying the cups, and FIG. 3 schematically shows a plan view of the cups carried on an oval endless track.
Figure 2:
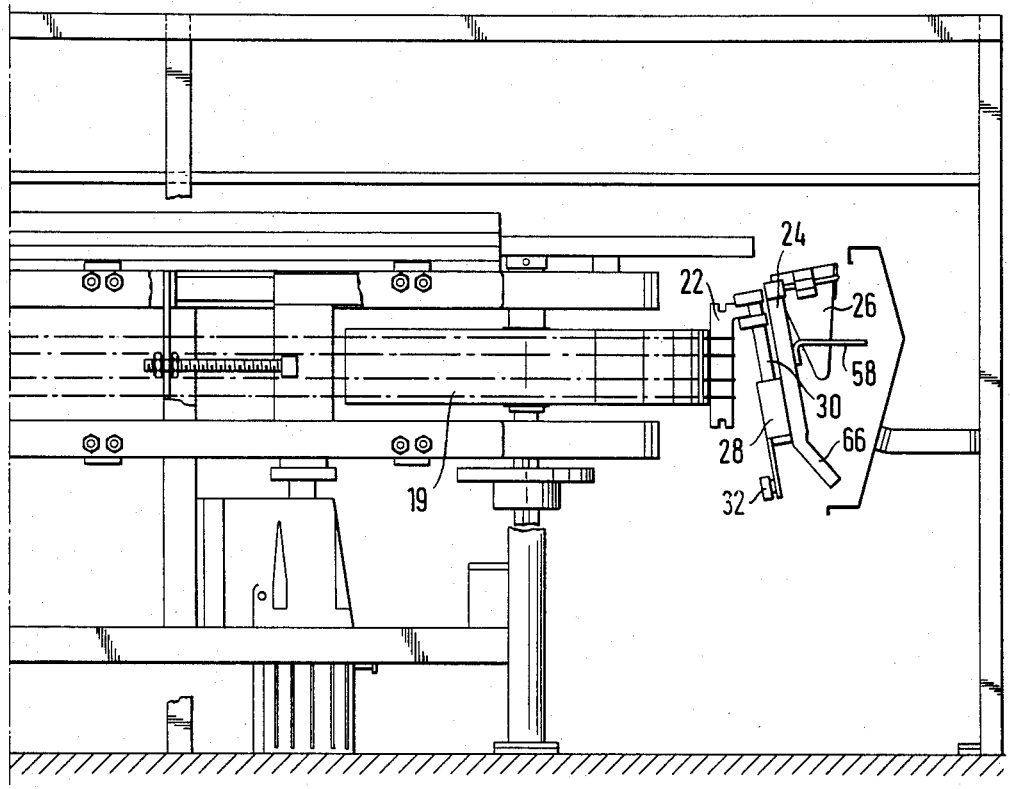
Figure 3:
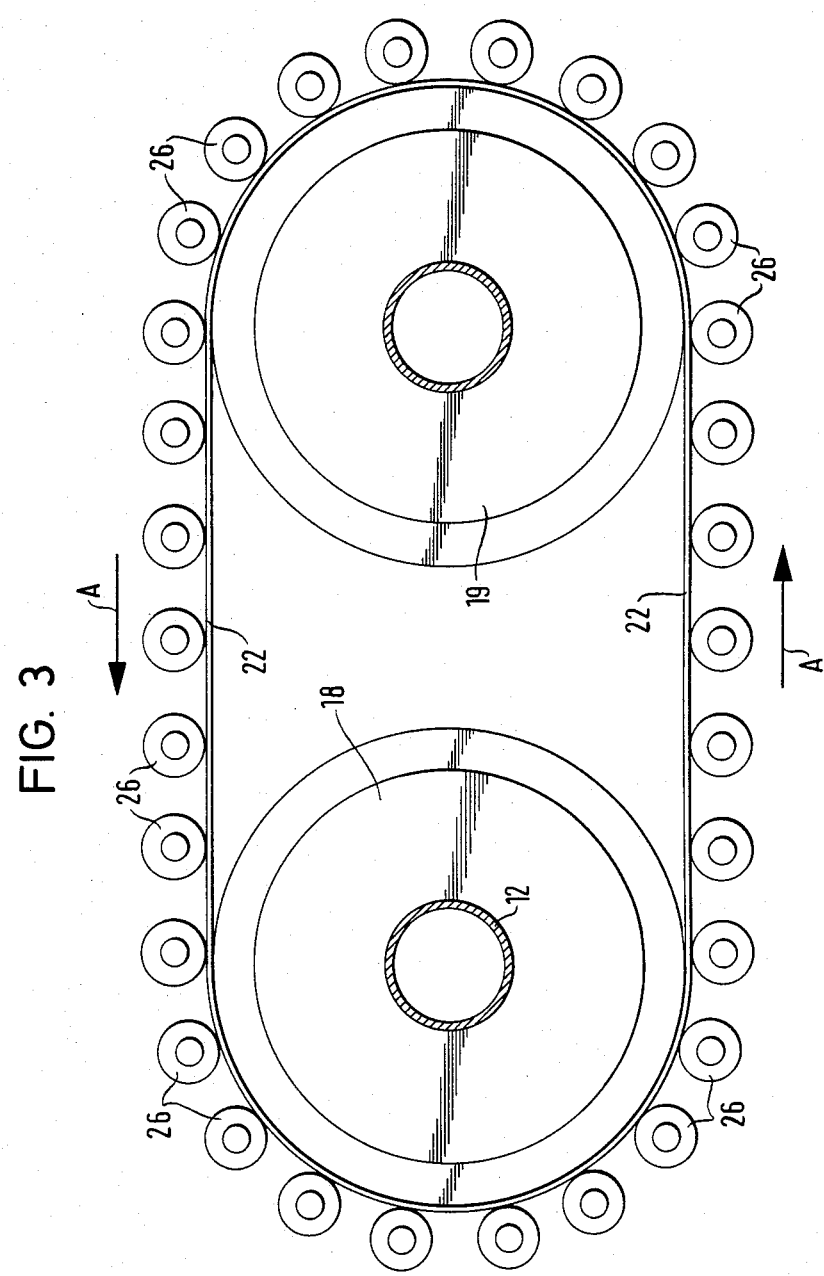

The so-called caroussel 10 represented in FIG. 1 provides a central shaft 12 on which a complete series of elements are driven, which elements are described separately in the following. Directly driven by this shaft are provided, looking from the top towards the bottom, an upper turntable 14, a middle turntable 16, a sprocket wheel 18 and a lower turntable 20. The sprocket wheel 18 forms a carrier for the turn-round region at the carrousel sides which carrier, as shown in FIG. 2, is turned around at a position at the side of the carrousel near a further sprocket wheel 19 which is provided there. Between the two sprocket wheels the carrier 22 takes a rectilinear course (FIG. 3).

To the chain carrier 22 is secured a support 24 which carries at its upper end a cup having a lower end which is open and radially spreadable, and which essentially tapers towards the lower opening. At the lower end of the support 24 on the side opposite to the cup, that is in the direction of the shaft 12, is secured a housing 28 which is slideably guided on a guide rod 30 which is rigidly secured to the chain conveyor 22.

Moving downwards from the housing 28, there is a cam follower element 32 in the form of a freely rotating roller, which is guided in a stationary cam track 34. There is a whole series of holders with cups at fixed intervals along the chain carrier 22. The cups and the holders move in the area of the carrousel in a circle so that the cups 26 together with the holders 24 are essentially moved up and down in a vertical path. FIG. 1 shows in unbroken lines the lower position and the broken lines show the upper position of a cup and of a holder. On the middle turntable 16, distributed along the periphery there is a whole series of preferably pneumatic cylinders 36, the piston rod 38 of each being connected with a plunger 40. By means of cylinder 36 the plunger 40 can be moved up and down. The pushrod is shown in FIG. 1 in unbroken lines on the right side of the top position, and in broken lines on the left side of the top position. On the left side the lower position of the plunger 40 is shown in unbroken lines, to the extent that these parts are not covered by the cup. The cylinder 36 is so inclined with the piston rod 38 and the plunger 40 against the plane of the middle turntable 16, which is arranged perpendicularly to the axis of the shaft, at an angle, that at least in the actual insertion region of the giblets into the body cavity of the poultry, said insertion region being located on a part-circular path, the direction of motion of the plunger 40 points directly into the associated cup 26.

On the left side of FIG. 1, the parts described above are shown in unbroken lines in the position in which the cup is inserted in the body cavity of poultry and the bag containing the giblets, which has earlier been placed in the cup, has already been rammed into the body cavity of the poultry.

In order to stabilize the poultry for the insertion process as far as possible, on the lower turntable 20 there is a series of pressure elements 42 which are hinged so that they can be pivoted around an axis parallel and tangential to the plane of the turntable 20, so that these pressure elements 42, in the insertion region of the giblets into the body cavities of the poultry, during the part-circular motion, can be pressed toward the poultry. For this purpose the pressure element 42 has an adjusting rod 44, which is equipped on the end opposite the named axis 46 with a cam follower member 48 designed as a roller. On adjusting rod 44 there is a pressure member 55, which is shown on the left side of FIG. 1 in the position in which it is pressed to the poultry. The cam follower member 48, in order to effect the pivoting motion of the adjusting rod 44, follows a stationary cam track 56.

On the holder 24 for the cups 26 and on the side of the cups, there is a spreader element 58, which moves when the cups are lowered between the legs of the poultry and thereby spreads the legs of the poultry and the body cavity aperture so that a perfect insertion of the cup into the body cavity and thus of the giblets contained in the bag is made possible.

On the top turntable 14 there is at least one control valve 60, by means of which the respective cylinder 36 is controlled. This control valve 60 is connected with a photo-optically driven control device 62 which always actuates the valve when poultry has been identified photo-optically after being brought by an additional conveyor 64 to the insertion region.

The modus operandi of the device described above is as follows: the poultry is moved suspended by the legs by means of conveyor 64 continuously to the insertion region for the giblets into the poultry. Synchronized with this, the giblets packed in bags are brought with the cups mentioned above into the insertion region. The insertion of the bags into the cups takes place in the straight section of a substantially oval path of the chain carrier 22. In the insertion region, the poultry as well as the cups and also the plunger move on a part-circular path. In the insertion region, the pressure element 42 which also moves on said path is pressed onto the poultry. Because of the compulsory control described above via the cam track 34, a cup 26 is moved downwards and is inserted into the body cavity of the poultry supplied by the conveyor 64. Now the spreader element 58 is thrust between the legs of the poultry and facilitates the insertion of the cup 26. During this process the holder 24 of the cup 26 forms a counter-surface for the poultry having an angled section 66 which is bent in the direction of the pressure element 42.

When because of the photo-optical sensor described above, the presence of poultry is determined on the corresponding point of the conveyor 64, the plunger 40 is moved by the pneumatic cylinder 36 in the direction already stated, in order to thrust the bag with the giblets into the body cavity of the poultry. At this point the lower end of the cup, which is substantially closed, spreads out due to its flexibility.

After this insertion process successively either due to the compulsory control caused by the cam track or due to the special drive of the pneumatic cylinder, the individual parts are brought back to their initial positions. The poultry is then taken away behind the carrousel area.

When at a point on conveyor 64 no poultry is detected photo-optically, the plunger is not actuated. Thus the cup moves downwards, without the bag being ejected from the cup. When this cup with the bag of giblets passes the operator, who fills the cups with the bags of giblets, this cup does not have to be filled in the preset sequence. But it is also ensured that there is no ejection of a bag from the cup without its dropping into the poultry. The named stabilizer devices promote automated operation of the entire installation.

The plunger 40 comprises two partial sections 41 and 41', of which the front section in the direction of insertion 41' has a smaller diameter than the back section 41. The diameters are dimensioned so that during relatively fast up and downward motion of the plunger, preferably at a speed of at least 1 m/s, firstly the blunt frontal side of the section with the smaller diameter encounters the giblets. Shortly after the impact of this section on the giblets the section of greater diameter impacts on the inner wall of the respective cup, which has already been introduced into the body cavity of the poultry, together with the poultry walls, pushing them outwards, so that this spreading force does not have to be transferred via the giblets to the cup and to the poultry.

Preferably the cup 26 and the plunger 40 together with their associated piston rod are arranged at an angle to the drive shaft 12 and to the poultry hanging downwards so that the giblets are moved in the direction of the inner wall of the back of the poultry and are inserted substantially along this wall into the body cavity.

I claim:

1. Apparatus for the introduction of poultry giblets into the evacuated body cavities of poultry comprising first conveying means for transporting birds suspended by the legs through an insertion region, second conveying means for conveying downwardly opening cups containing giblets through the insertion region in synchronism with the first conveying means, means in the insertion region for sequentially moving individual cups to individual birds as the cups and birds are passed through the insertion region in a manner permitting giblets to be expelled downwardly from the cups into the body cavities of the birds, plunger means having at least one plunger operable in the insertion region for moving into the cups and expelling giblets from respective cups into the body cavities of respective birds, and plunger control means for selectively operating the plunger means to expel giblets from a cup only if a bird is present at the insertion region to receive the giblets, said plunger control means including sensor means for detecting the presence of birds at the insertion region, and plunger operating means controlled by the sensor means to expel giblets from a cup only upon said detecting, said cups having laterally spreadable walls, said at least one plunger having a forward section and a larger diameter rear section, the diameters of the plunger sections being related to the cross-dimensions of the cups so that substantial spreading of the spreadable walls is caused by engagement of said rear section with the spreadable walls rather than by pressure of giblets expelled by said forward section.

2. The apparatus of claim 1, wherein the second conveying means has an endless track.

3. The apparatus of claim 1 including spreader means carried with the cups for facilitating insertion of the cups into the body cavities of the birds.

4. The apparatus of claim 1, wherein the plunger operating means comprises pneumatic piston and cylinder means.

5. The apparatus of claim 1, wherein the plunger means comprises plural plungers movable in synchronism with the cups and poultry through the insertion region and wherein the plunger control means is adapted to operate sequentially on individual plungers.

6. The apparatus of claim 1, wherein the plunger means is adapted to move with a speed of at least 1 meter/second in the direction of the cups.

7. The apparatus of claim 1, wherein the cups and plunger means are inclined to the vertical.

8. The apparatus of claim 3, wherein each cup and the spreader means carried therewith are supported on a holder for joint movement toward a bird at the insertion region.

9. The apparatus of claim 5, wherein the plural plungers are mounted on a support that moves the plungers through the insertion region at a constant level and wherein the plunger control means causes each plunger to be driven downwardly from said level by the plunger operating means and into a cup at the insertion region only upon said detecting of a bird.

10. The apparatus of claim 9, wherein the plunger operating means comprises an individual cylinder and piston rod for driving each plunger, respectively, in response to fluid pressure in the cylinder.

11. Apparatus for the introduction of poultry giblets into the evacuated body cavities of poultry comprising first conveying means for transporting birds suspended by the legs through an insertion region, second conveying means for conveying downwardly opening cups containing giblets through the insertion region in synchronism with the first conveying means, means in the insertion region for sequentially moving individual cups to individual birds as the cups and birds are passed through the insertion region in a manner permitting giblets to be expelled downwardly from the cups into the body cavities of the birds, plunger means having at least one plunger operable in the insertion region for moving into the cups and expelling giblets from respective cups into the body cavities of respective birds, and plunger control means for selectively operating the plunger means to expel giblets from a cup only if a bird is present at the insertion region to receive the giblets, said plunger control means including sensor means for detecting the presence of birds at the insertion region, and plunger operating means controlled by the sensor means to expel giblets from a cup only upon said detecting, said cups having laterally spreadable walls and the shape of the cups and the shape of the plunger means being correlated to cause the plunger means to impact upon the cup walls so that the cup walls are spread substantially by impact of the plunger means thereon, rather than by giblets expelled by the plunger means.

12. Apparatus for the introduction of poultry giblets into the evacuated body cavities of poultry comprising first conveying means for transporting birds suspended by the legs through an insertion region, second conveying means for conveying downwardly opening cups containing giblets through the insertion region in synchronism with the first conveying means, means in the insertion region for sequentially moving individual cups to individual birds as the cups and birds are passed through the insertion region in a manner permitting giblets to be expelled downwardly from the cups into the body cavities of the birds, plunger means having at least one plunger operable in the insertion region for moving into the cups and expelling giblets from respective cups into the body cavities of respective birds, plunger control means for selectively operating the plunger means to expel giblets from a cup only if a bird is present at the insertion region to receive the giblets, said plunger control means including sensor means for detecting the presence of birds at the insertion region, and plunger operating means controlled by the sensor means to expel giblets from a cup only upon said detecting, and pressure-applying means for applying stabilizing pressure to the birds in the insertion region, said pressure-applying means comprising a presser movable into engagement with a side of a bird at the insertion region and means for supporting the opposite side of that bird, the last-mentioned means comprising holder means for said cups.

* * * * *